United States Patent [19]

Mackovjak et al.

[11] Patent Number: 4,721,325
[45] Date of Patent: Jan. 26, 1988

[54] SUSPENSION STRUT WITH QUICK TAKE-APART UPPER MOUNT

[75] Inventors: John M. Mackovjak, Romeo; Marvin J. Hyma, Pontiac, both of Mich.

[73] Assignee: General Motors Corporation, Detroit, Mich.

[21] Appl. No.: 932,403

[22] Filed: Nov. 19, 1986

[51] Int. Cl.⁴ .............................................. B60G 11/14
[52] U.S. Cl. ................................ 280/668; 188/322.11; 267/33; 403/11
[58] Field of Search ............... 280/668, 701, 702, 724; 267/33; 188/322.11; 403/11

[56] References Cited

U.S. PATENT DOCUMENTS

| | | | |
|---|---|---|---|
| 4,175,770 | 11/1979 | Draisbach et al. | 280/668 |
| 4,276,971 | 7/1981 | Horvath | 403/11 |
| 4,372,575 | 2/1983 | Hyma | 280/668 |
| 4,465,296 | 8/1984 | Shiratori et al. | 280/668 |
| 4,531,759 | 7/1986 | Renzanka et al. | 280/668 |
| 4,552,467 | 11/1985 | Takei et al. | 280/668 |

Primary Examiner—John J. Love
Assistant Examiner—Kenneth R. Rice
Attorney, Agent, or Firm—Charles R. White

[57] ABSTRACT

Vehicle suspension strut with quick take-apart upper mount featuring a jounce bumper retainer which can be turned from a locked to an unlocked position and axially removed for jounce bumper service and to allow access to service the strut through the engine compartment so that the expense of removing the strut and spring is eliminated. The design effectively eliminates prior upper spring seat designs and is simple and inexpensive and readily accommodates high service loads.

5 Claims, 5 Drawing Figures

SUSPENSION STRUT WITH QUICK TAKE-APART UPPER MOUNT

This invention relates to vehicle suspension struts and more particularly to a quick take-apart upper strut mount including a jounce bumper and retainer assembly unlockable and removable for jounce bumper service while providing a large diameter axial service opening to the top of the support tube of the strut so that the strut can be opened while on the vehicle to provide access to and service of the internal components of the strut.

Prior to the present invention various serviceable struts, generally those of the MacPherson type, have been devised to allow service of the internal parts of the strut while attached to the vehicle. An illustrative of such a serviceable strut is disclosed in U.S. Pat. No. 4,531,759, issued July 30, 1985 to Rezanka et al, entitled SUSPENSION STRUT WITH ONBOARD SERVICE OF SHOCK ABSORBER CARTRIDGE, assigned to the assignee of this invention and hereby incorporated by reference. The present invention is of the general category as the Rezanka et al strut but further provides a straight-forward and improved take-apart upper mount featuring simplified construction that optimizes manufacture, reduces cost and facilitates onboard repair.

Another feature, object and advantage of this invention is to provide an upper mount with a unitized jounce bumper and retainer that can be readily unlocked and removed for service or replacement while providing a large diameter access opening to the upper end of the strut for onboard service of the internal components thereof.

Another feature, object and advantage of this invention is to provide a new and improved piston rod mount assembly which operatively connects the piston rod to the mount for shear operation with straight forward and simplified construction having and a new and improved boot seal with snap on fit to a lower spring seat mounted by bearings to the support tube.

Another feature, object and advantage of this invention is the provision of a new and improved upper and lower suspension spring seat with the upper seat being an upper retention cup assembly fixed to the vehicle body work and the lower seat being rotatably mounted by bearings to the steerable strut.

Another feature, object and advantage of this invention is to provide a vehicle suspension strut with quick take-apart release upper mount featuring a jounce bumper retainer which can be turned preferably about 30° and less than 360° from a locked to an unlocked position and axially removed for jounce bumper service and to allow access to service the strut without going through the jounce bumper for onboard service of the strut so that the expense of removing the strut and suspension spring is eliminated. This design further effectively replaces prior upper spring seat designs with the retention cup of the mount and is simple and inexpensive and readily accommodates high service loads.

This invention generally comprises a retention cup assembly, a jounce bumper assembly and a piston rod shear mount assembly all readily interconnected and readily removable and easily rebuilt to provide the improved take-apart upper mount assembly for access to the internals of the strut for repair or replacement of the hydraulic components thereof. With this invention, the upper spring seat and bearing assembly is eliminated with a large diameter bearing used on the lower seat to permit the turning of the strut so that steering can be achieved without steering loads imparted to the suspension spring.

These and other features, objects and advantages of the present invention will become more apparent from the following detailed description and drawing in which.

Figure 1:
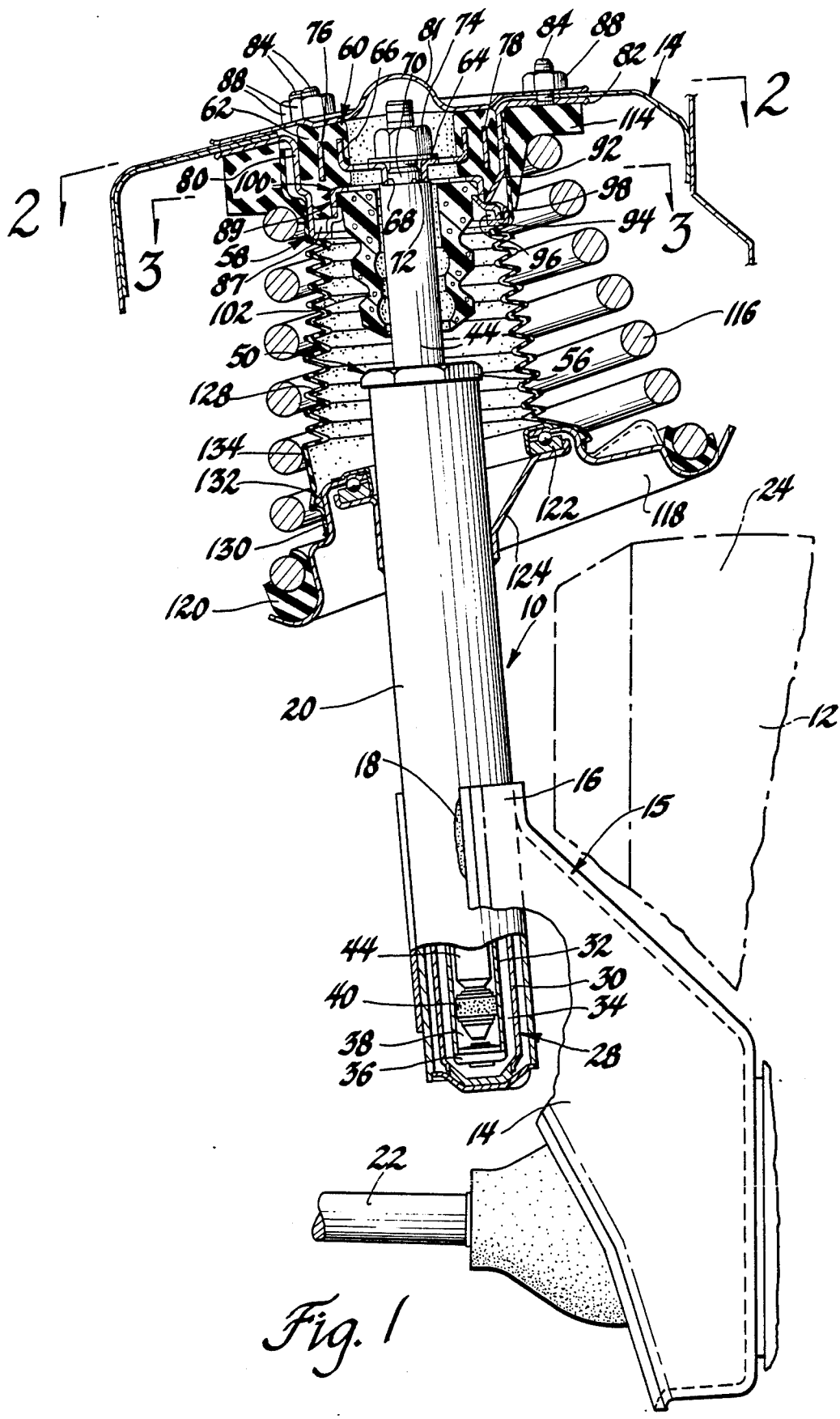
FIG. 1 is a front elevational type view partially in cross section of a suspension strut for a dirigible road wheel assembly.

Turning now in greater detail to the drawing, there is shown in FIG. 1 a vehicle suspension strut assembly 10 steerably mounting a road wheel assembly 12 to the mounting tower 14 or other support structure of a road vehicle. The road wheel assembly 12 includes a stamped metal steering knuckle 15 that has a partially cylindrical upper end 16 that is secured by welds 18 to an outer cylindrical support tube of the suspension strut assembly 10. A conventional drive axle 22, transmitting power from the differential, rotatably drives the road wheel 24 connected thereto by a conventional road wheel hub and bearing assembly operatively mounted in the steering knuckle 15. A conventional lower control arm, not shown, mounts the wheel assembly to the vehicle framework for limited jounce and rebound pivotal movements.

Figure 5:
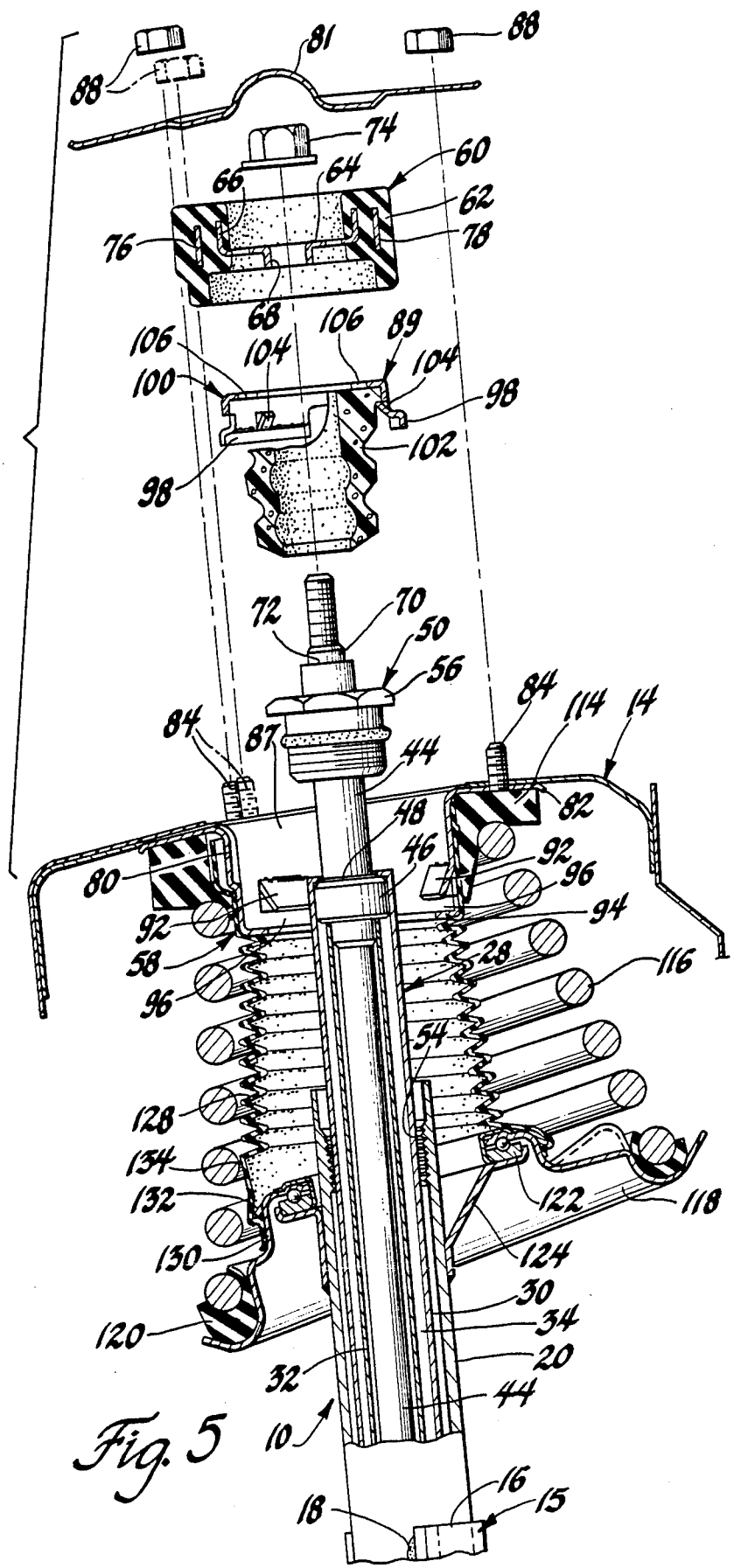
FIG. 5 is an elevational view similar to the view of FIG. 1 but showing the removal of components of the strut.

Operatively mounted within the support tube 20 of the suspension strut assembly is a damper cartridge 28 such as described in the U.S. Pat. No. 4,276,971, issued July 7, 1981 to R. A. Horvath, entitled VEHICLE SUSPENSION STRUT WITH SERVICEABLE SHOCK ABSORBER CARTRIDGES, assigned to the assignee of the present invention and hereby incorporated by reference. The damper cartridge 28 is a self-contained hydraulic damper, the details of which are best shown in FIGS. 1 and 5 and in the above referenced U.S. Pat. No. 4,276,971. This cartridge comprises an outer reservoir tube 30 which cooperates with an inner cylinder tube 32 to form a reservoir 34 for shock absorber fluid used in this unit. Disposed in the lower end of the cylinder tube 32 is a base valve assembly 36 for controlling the flow of hydraulic shock absorber fluid between the reservoir 34 and the variable volume chamber 38 in the cylinder tube formed between the valved piston 40 and the base valve 36. A piston rod 44 extends axially upward from attachment with the piston 40 through the cylinder tube 32 and slidably through the rod guide 46 and upper seal 48 forming the upper end of the cartridge. To secure the cartridge in place, a service nut 50, having a depending externally threaded cylindrical wall 52, threads into the internal threads 54 of the support tube 20. The service nut 50 has a hex head 56 to accommodate a mating socket of a socket wrench such as described in the above referenced patent to Rezanka et al so that the nut 50 may be turned into the support tube and advanced to the FIG. 1 position to secure the damper cartridge 28 in operative position. FIG. 5 shows the service nut threaded out of the support tube so that the damper cartridge of the hydraulic shock absorber or other components can be removed and repaired or replaced as required. From the rod guide 46 and seal 48, the piston rod 44 extends into operative connection with the quick take-apart upper mount assembly 58.

The quick take-apart upper mount assembly 58 comprises a piston rod shear mount assembly 60 formed from an annulus 62 of resilient elastomer material which is loaded in shear by the hydraulic loads of the piston 40 as it reciprocally moves in the cylinder tube to check the action of the suspension spring. As shown in FIG. 1, this shear mount assembly is mechanically joined to the upper end of the piston rod 44 by a metallic cup-shaped connector 64 whose outer annular wall 66 is embedded into the elastomer annulus 62 and near the inner diameter thereof. This connector has a downwardly extending neck 68 that fits on the reduced diameter upper end 70 of the piston rod and has a lower end seated on shoulder 72 formed on the rod. The upper end of the piston rod is threaded to receive a hex nut 74 that threads downwardly against the inner surface of the cup-shaped connector 64 to thereby secure the piston rod 44 and the piston to the elastomer isolator or annulus 62 of the shear mount assembly 60. The metallic elements 76 and 78 are rate plates to improve the lateral stiffness of the elastomer isolator 62.

Figure 2:
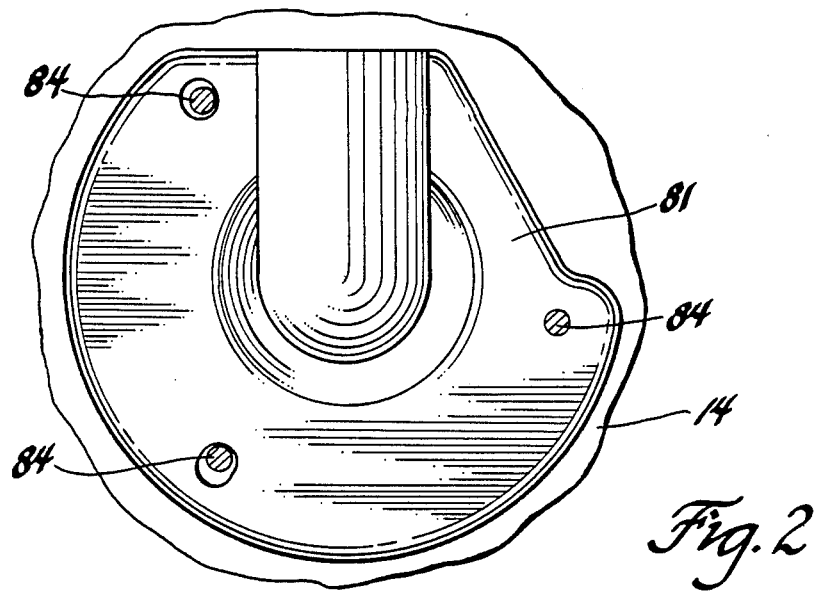
FIG. 2 is a top view of the mounting tower of the suspension strut assembly of this invention and is taken along lines 2—2 of FIG. 1.

The elastomer shear mount 60 is diametrically sized to fit within a retention cup 80 which has an upper annular flange 82 that extends radially outwardly from the body of the cup and forms the base of the upper seat for the suspension spring. Attachment screws 84 project upwardly from flange 82 through openings in the top of the mounting tower 14 to receive nuts 88 that thread onto the screws to fasten the cup 80 to the underside of the mounting tower 14. There is a cover plate 81 which is mounted over the piston rod shear mount assembly 60 and the jounce bumper assemblies 89 whose removal defines a wide diameter access opening 87 for onboard service of the strut. The retention cup 80 and cover 81 are secured in place by the nuts and threaded screws as best shown in FIGS. 1 and 2. The cup 80 has three tangs 92 lanced inwardly into access opening 87 from the side wall thereof. As shown, these tangs are equidistant and arcuately spaced from one another and cooperate with the inwardly extending and lower annular rim 94 of the cup to form three arcuately separated retention or locking spaces 96 for the radial extending and arcuately spaced ear-like keepers 98 that extend outwardly from the lower end of the jounce bumper retainer cup 100 of the jounce bumper retainer assembly. Lanced inwardly from the sides of the retainer cup are tangs 104 which tightly grip the top of the generally cylindrical and multi-lobed jounce bumper 102 preferably made of a urethane foam suitable resilient material.

Figure 3:
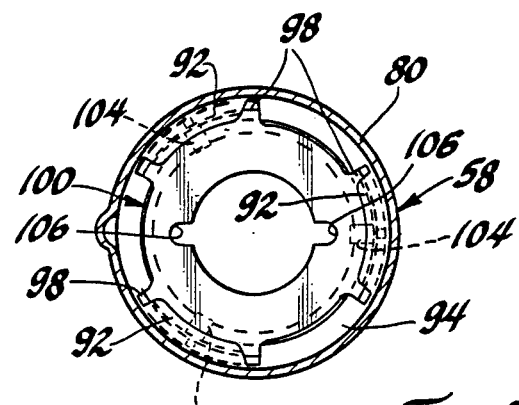
FIG. 3 is a cross-sectional view but with parts removed taken generally along lines 3—3 of FIG. 1.
Figure 4:
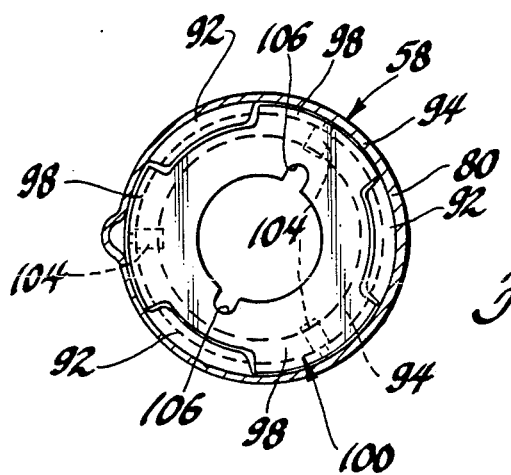
FIG. 4 is a view similar to the view of FIG. 3 showing parts rotated to a position for this assembly.

The tangs retain the jounce bumper in position for contact with the hex nut of the strut on jounce loads to effectively cushion jounce loads and reduce the transmittal of jounce energy into the vehicle. With the jounce bumper inserted into the retainer cup 100 as shown in FIG. 4, the jounce bumper can be turned about 30° clockwise or counterclockwise direction by use of a spanner tool with the spanner teeth received in the notches 106 by turning the retainer cup from the FIG. 4 to the FIG. 3 position. The keepers 98 are located so that the retention spaces 96 to provide a modified bayonet type lock and the quick installation of the jounce bumper to the retainer cup is accomplished. Quick release or unlocking is similarly accomplished by turning the cup 30° preferably in a flat plane with the spanner wrench from the locking FIG. 3 position to the unlocking FIG. 4 position and then axially withdrawing the jounce bumper and its retention cup. The large diameter access opening is obtained and tooling does not have to be inserted through the jounce bumper.

Disposed around the outer diameter of cup 80 and against the underside of flange 82 is a thick washer-like elastomeric elastomer isolator 114 which cooperatively forms the cushioned seat for the upper turn of the helical suspension spring 116 that is mounted on the lower spring seat 118 that has a lower annular isolator 120 between the spring seat and the lower turn thereof. The lower spring seat is further supported by an annular bearing unit 122 which is fixed to a support bearing 124 welded or otherwise secured to the outer support tube 20. With this construction, the road wheel can be steered without turning of the suspension spring and any appreciable turning of the piston rod in the strut. With this arrangement, the upper spring seat of the prior art has been effectively eliminated and replaced by the isolator 114 and cup 80 which seats against the lower surface of the flange of the cup. The boot seal 128 is secured at its upper end between the cup 80 and the isolator 114. Its annular corrugation or accordion folds extend downwardly and around the jounce bumper and piston rod 44 to a terminal end fitted over the shoulder 130 of the lower spring seat 118. Six tangs 132 radially spaced from one another extend into the lower corrugation 134 of the boot to provide securement of the boot to the seat.

In this invention, if service of the piston rod shear mount assembly, the jounce bumper assembly or any of the internal components of the suspension strut is needed, the cover plate 81 can be threadedly removed by turning the hex nuts from the threaded screws 84 and manually removing the cover. This provides access to the piston nut 74 which can be turned off of the end of the piston rod by a simple socket. After the nut 74 is removed the piston rod shear mount assembly can be manually removed from the retention cup assembly which still supports the suspension spring so that the strut does not have to be removed from the vehicle and is supported thereby. After the piston rod shear mount has been removed, the spanner wrench can be inserted into the access opening provided by the removal of the piston rod shear mount assembly 60 and the jounce bumper and retention cup assembly are turned about 30° in a flat plane from the locked FIG. 3 position to the unlocked FIG. 4 position. The jounce bumper assembly can then be axially removed for service and so that a very large diameter axial access opening is provided so that the socket such as described in the Rezanka et al patent can be inserted to remove the hex nut of the unit. The socket does not have to be inserted through the jounce bumper as in the referenced construction to optimize its service and to eliminate wear or damage potential to the bumper. After hex nut 50 has been removed, the shock absorber cartridge assembly can be readily removed by grasping the piston rod 44 and axially removing the piston rod from the unit which will bring out the cartridge or the other shock absorber components fixed thereto. In the event that the shock absorber service is needed, a replacement cartridge can be inserted in its place and the procedure reversed as described above to re-establish the strut while on the vehicle.

While a preferred embodiment of the invention has been shown and described to illustrate the invention, other modifications will now become more apparent to those skilled in the art. Accordingly, the scope of this invention is set forth in the following claims.

The embodiments of the invention in which an exclusive property or privilege is claimed are defined as follows:

1. In a wheeled automotive vehicle having a body with suspension support structure, a serviceable vehicle suspension strut with hydraulic shock absorber means operatively mounted therein, said strut mounting a road wheel of said vehicle to said support structure, said support structure having an access opening for servicing said shock absorber means, said strut comprising an outer support tube operatively connected to the vehicle road wheel and extending upwardly therefrom, said hydraulic shock absorber means operatively mounted within said support tube and separable therefrom, said shock absorber means incorporating a piston and piston rod operatively mounted therein, a suspension spring having a lower end mounted to the support tube and extending upwardly therearound, an upper mount assembly for said strut, said upper mount assembly having a retention cup assembly which receives the loads from said suspension spring, a piston rod shear mount assembly mounted in said retention cup assembly, and jounce bumper assembly mounted by quick release retention means to said retention cup assembly, and nut means securing said piston rod shear mount assembly to said piston rod and cover plate means securing said piston rod shear mount assembly therein, said shear mount and jounce bumper assemblies being readily removable to provide an axial opening to the upper portion of said support tube to provide access to the interior thereof through a removable retainer means fastened to the upper end of said support tube thereby allowing for the onboard service of said strut.

2. In a wheeled automotive vehicle having a body with suspension support structure, a serviceable vehicle suspension strut with hydraulic shock absorber means operatively mounted therein, said strut mounting a road wheel of said vehicle to said support structure, said support structure having an access opening for servicing said shock absorber means, said strut comprising an outer support tube operatively connected to the vehicle road wheel and extending upwardly therefrom, said hydraulic shock absorber means operatively mounted within said support tube and separable therefrom, said shock absorber means incorporating a piston and piston rod operatively mounted therein, a suspension spring having a lower end mounted to the support tube and extending upwardly therearound, an upper mount assembly for said strut, said upper mount assembly having a retention cup assembly which receives the loads from said suspension spring, a piston rod shear mount assembly mounted in said retention cup assembly, and jounce bumper assembly means mounted by quick release locking means to said retention cup assembly, and nut means securing said piston rod shear mount assembly to said piston rod and cover plate means securing said piston rod shear mount assembly therein, said upper mount assembly being readily removable to provide an axial opening to the upper portion of said support tube to provide access to the interior thereof through a removable retainer means fastened to the upper end of said support tube thereby allowing for the onboard service of said strut.

3. A serviceable suspension strut which mounts a road wheel of a vehicle to support structure therein and incorporating a helical suspension spring operatively mounted between the strut and support structure, a support tube operatively connected to the vehicle road wheel and extending upwardly therefrom, a hydraulic shock absorber having a piston and piston rod assembly operatively mounted in said support tube, said suspension spring having a lower end coil mounted to the support tube and extending upwardly therefrom around said support tube, an upper quick take-apart mount for said strut, said upper take-apart mount having a first section with a resilient elastomer member attached to the piston rod to receive the hydraulic loads from said piston in jounce and rebound movement, said mount further having a second section including a resilient jounce member for cushioning jounce loads of said strut and quick release locking means rotatable through an arc of less than 360° connecting said jounce bumper assembly to said first member to allow said jounce bumper assembly to be removed axially through the upper part of said mount assembly to provide an axial passage to said strut so that said shock absorber can be serviced by removal of said piston from said support tube through said opening and replaced by a replacement shock absorber means while said suspension spring supports said vehicle.

4. The strut defined in claim 3 above and further including a service nut to releasably fit on the end of said support tube for retaining said shock absorber therein, said jounce bumper being secured to said jounce bumper assembly and being removable from said upper mount assembly by limited turning in a flat plane to provide a wide diameter access opening for receiving a wrenching tool insertable in said unit.

5. A mount for operatively connecting a vehicle suspension strut having a support tube with an upper end disposed beneath said mount and having an associated helical spring attached to support structure in a vehicle, said mount comprising an annular spring seat having a centralized opening and having a flange for receiving the upper end coil of said spring adjacent to said support structure of said vehicle, a generally cylindrical jounce bumper forming a releasable part of said upper mount and having a central opening therethrough supported by said upper mount above the upper end of said strut and engageable therewith to deflect and cushion and limit jounce motions of said strut, an elastomer mounting ring having a central opening therethrough secured to said support structure and disposed above said spring seat for receiving vehicle suspension load, said support structure having a strut access opening therethrough, fastener means connecting said upper mount assembly to said support structure adjacent to said access opening and a cover plate assembly removably attaching to said support structure for uncovering said access opening in said support structure when removed to provide substantially unrestricted passage and an access to the upper end of said strut directly through said central opening in said upper mount assembly after said jounce bumper assembly has been axially removed therefrom.

* * * * *